US010938574B2

(12) United States Patent
Drake et al.

(10) Patent No.: US 10,938,574 B2
(45) Date of Patent: Mar. 2, 2021

(54) CRYPTOGRAPHIC FONT SCRIPT WITH INTEGRATED SIGNATURE FOR VERIFICATION

(71) Applicant: T-Mobile USA, Inc., Bellevue, WA (US)

(72) Inventors: Aaron Drake, Sammamish, WA (US); Lee Miller London, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 39 days.

(21) Appl. No.: 16/200,498

(22) Filed: Nov. 26, 2018

(65) Prior Publication Data

US 2020/0169411 A1 May 28, 2020

(51) Int. Cl.

*H04L 9/32* (2006.01)
*G06F 21/32* (2013.01)
*H04L 9/06* (2006.01)
*G06F 21/62* (2013.01)

(52) U.S. Cl.

CPC ............ *H04L 9/3247* (2013.01); *G06F 21/32* (2013.01); *G06F 21/6209* (2013.01); *H04L 9/0637* (2013.01); *H04L 9/3265* (2013.01)

(58) Field of Classification Search

CPC ... H04L 9/3247; H04L 9/0637; H04L 9/3265; H04L 2209/38; H04L 9/3239; G06F 21/32; G06F 21/6209; G06F 21/64

See application file for complete search history.

(56) References Cited

U.S. PATENT DOCUMENTS 6,978,367 B1 * 12/2005 Hind ..................... G06F 21/577 380/273
2008/0263363 A1 * 10/2008 Jueneman .............. H04L 9/085 713/184
2009/0177891 A1 * 7/2009 Carro ................. G06F 21/6209 713/179
2012/0192261 A1 * 7/2012 Blot-Levevre ....... G06Q 20/322 726/10
2013/0181995 A1 * 7/2013 Zhou ...................... G06T 11/60 345/467
2014/0240523 A1 * 8/2014 Dodla .................. G06F 16/434 348/207.1
2015/0312233 A1 * 10/2015 Graham, III .......... H04L 67/125 713/171
2016/0043867 A1 * 2/2016 Bonsignore ........... H04L 9/3247 713/168
2016/0212146 A1 * 7/2016 Wilson ................. H04L 9/3226
2016/0308855 A1 * 10/2016 Lacey .................. H04L 63/061

(Continued)

*Primary Examiner* — Cheng-Feng Huang

(74) *Attorney, Agent, or Firm* — Han Santos, PLLC; Gloria M. Steinberg

(57) ABSTRACT

This disclosure describes techniques for authenticating text documents that can include a cryptographic font script. The text documents can be generated using a text editor application that can generate a machine-readable code or a unique document identification (ID) that can include a metadata component having various authentication data and that can cryptographically sign the documents. The signature on the document can be used to verify the data and identity of the signer. Each such transaction is referenced in a blockchain to construe a public ledger representing the ownership of the text documents from the full record of transactions in the blockchain.

18 Claims, 4 Drawing Sheets

(56) References Cited

U.S. PATENT DOCUMENTS

2017/0091750 A1* 3/2017 Maim ........................ H04L 9/30
2017/0126702 A1* 5/2017 Krishnamurthy ..... H04L 63/123
2017/0346804 A1* 11/2017 Beecham .............. H04L 63/083
2018/0330212 A1* 11/2018 Kumar .................. H04L 9/3234
2019/0005268 A1* 1/2019 Gupta .............. G06K 19/06037
2019/0080392 A1* 3/2019 Youb ...................... G06Q 40/00
2019/0305959 A1* 10/2019 Reddy ....................... G06F 8/60

* cited by examiner

CRYPTOGRAPHIC FONT SCRIPT WITH INTEGRATED SIGNATURE FOR VERIFICATION

BACKGROUND

Various electronic authentication methods are used to authenticate and confirm the integrity of documents and their signers. Most of these methods utilize digital signaturing that comprise some form of asymmetric cryptography. One common data-signing method relies on some form of the Public Key Infrastructure (PKI). Digital signatures typically require creating a unique identifier used for sender verification purposes in order to emulate the signature systems available in the paper-based transaction world. One level of authentication stems from the unique digital signature itself. Similar to a manually signed signature, a digital signature is unique to the sender, and therefore shows that the sender has authored or read the document and affixed his or her signature to indicate his or her approval of its contents.

Another level provides a notary function similar to that in the paper world by requiring that the document be encrypted with the sender's private key. Finally, the digital signature provides a means of preventing unauthorized alterations of the document by incorporating a message integrity code (MIC) computed to yield a "checksum" quantity unique to the particular combination of letters and spaces in the message at the time sent. In short, a digital signature scheme is an authentication mechanism with a powerful additional property: the recipient of a message may forward it to a third party and prove irrefutably that the document has not been manipulated since its author sent it. While the authentication and privacy enhancement afforded by digital signaturing can secure transactions flowing over the Internet, much of these transactions are limited based on the level of service obtained via, for example, digital signature software as well as the infrastructure of the software itself.

Additionally, authenticating physical documents created via text editor programs or word processors can add a level of complexity that digital signaturing or electronic authentication does not address. For example, creating a document utilizing a typeface generated using a person's handwriting can pose risks of forgery because penmanship is unique to the sender and can be instantly recognized, thereby creating an impression that the sender has authored or read the document even if there is no affixed signature or certification to indicate his or her approval of its contents.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
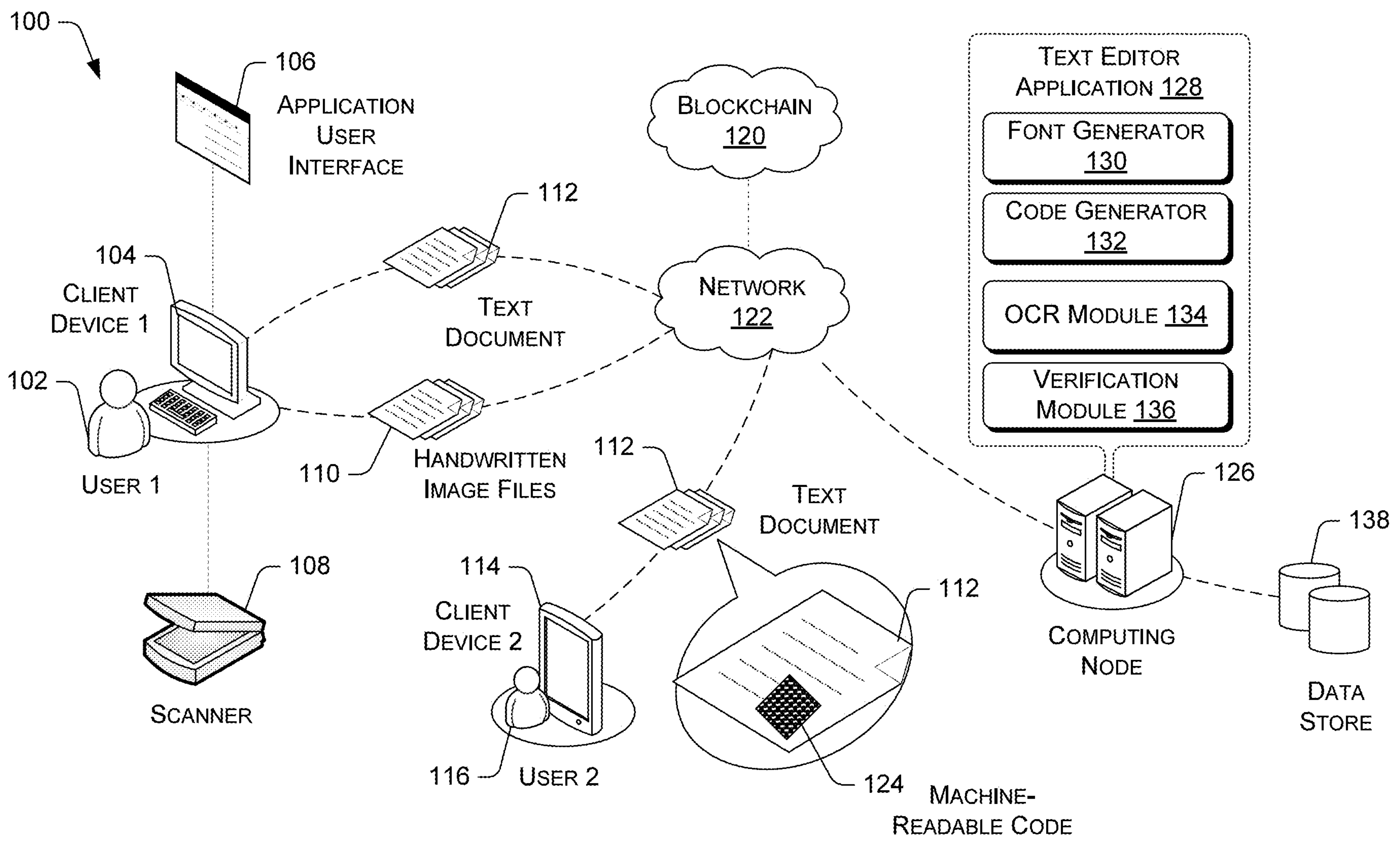
FIG. 1 illustrates example architecture for authenticating digital and physical copies of documents generated via a text editor application using blockchains.

This disclosure is directed to techniques for authenticating text documents created via a text editor application, wherein the text documents can comprise a handwritten computer-generated font. In various embodiments, public key cryptography can be applied, whereby public key cryptography signing algorithms can provide key distribution and secrecy (e.g., Diffie-Hellman key exchange, asymmetric key encryption scheme), provide digital signatures (e.g., Digital Signature Algorithm (DSA)), or both (e.g., RSA). A private key is generated locally on a user's computer such that it is private to that user. A public key can be derived from the private key and therefore correspond to the private key. The public key can be tied to a user's subject identifier (e.g., an email address) in a security certificate issued by a certificate authority. As long as the private key is kept secret, any signature produced using the private key serves as proof that the signer is the same party that originally published the public key. In addition to PKI, Authentication and Key Agreement (AKA) scheme, and/or other authentication protocol such as multi-factor authentication and SAS certification can be implemented, depending upon embodiments.

Public keys can be recorded in a public ledger of ownership rights. Digital assets can be associated with these public keys such that the public keys serve as the digital representation of the owner of the assets. A transfer of ownership of a digital asset from one public key to another can be signed with the corresponding secret private key of the sender to prove the authenticity and the integrity of the message. Thus, any record keeping entity tasked with recording changes and transfers to the ledger would have no way to forge such transfer if it was not initiated and signed by the sender. In this way, the signature also ensures that no data in the message is manipulated.

Signed transactions can be grouped into blocks that can be propagated to the whole network before subsequent blocks of transactions are produced. Each block references and builds off a previous block using cryptographic functions called hashes. A hash function takes arbitrary digital data as input and returns a fixed length pseudo random number as output. This hash function value generally falls within a very restrictive range set by a predefined protocol. Tying each block to its previous block with these hash functions in a consecutive order generates a chain, thereby creating a blockchain (i.e., a ledger), containing all accepted transactions. A blockchain thus forms a public record of all transactions.

A user can create and edit a text document using a text editor application. In various embodiments, the text editor application, upon creation of a new text document, enables the user to format the document using various features of the text editor application. In a conventional scenario, after authoring a text document, the user (i.e., the author) can electronically sign the document using digital signature software to certify the document and transmit it to another user (i.e., the recipient). Some digital signature software integrates with cloud storage services to allow users to save and access documents in any of their cloud storage accounts. During the authentication process, the signature and the document are encrypted, then treated with a hash to reveal whether the document has been compromised. However, because the signaturing relies on the digital signature software's infrastructure, the document and any related records are not truly public and thus not easily verifiable by all users.

In this regard, blockchains can be implemented to improve the integrity of documents and the verification of the identity of their authors by maintaining a public record of series of transactions made by one or more authors of a text document and subsequent recipients of the text document. A public ledger representing the state of ownership of text documents can be deduced from the full record of transactions in a blockchain beginning with the first block. Because each block contains a cryptographic hash of the immediate previous block or a reference that links it to the immediate previous block, if any data is changed or missing, the calculated cryptographic hashes would also change for all blocks from that point forward. The changed hashes would no longer fall within the range required by the predefined protocol, and the chain would be invalid. In this way, text documents cannot be manipulated or altered without affecting the blockchain.

In various embodiments, the user can format a text document, for example, by changing the font to display different typefaces. One or more fonts for the typefaces can comprise the user's handwriting or a computer-generated font that is at least partially based on the user's handwriting. In this regard, a scanned image of the user's handwriting can be uploaded for use as a unique customized font in the text editing application. The document is signed with the user's private key and such transaction is referenced in a blockchain to verify the ownership and the authenticity of the document. Various cryptographic time-stamping methods are available and could also be used. As noted above, the user's private key can authenticate the document to the extent that the private key is not compromised or known to anyone else but the user. Once the user (i.e., the author) sends a document to another user (i.e., a recipient), a record of the transaction is propagated through the blockchain distributed network, and the transaction cannot be reversed.

In various embodiments, techniques for authenticating a physical or an electronic copy of a text document generated via a text editor application are disclosed. A machine-readable code or a unique document identification (ID) that corresponds to the document can be displayed on its physical or electronic copy, wherein the code can comprise authentication data or other metadata associated with each transaction referenced in a blockchain. In the latter case, the unique document ID can be embedded within the document such that the document ID is an integral part of the document itself. When scanned, via a client device operating the text editor application, an electronic copy of the document can be presented to a user (i.e., a recipient of the document), via a user interface of the client device in order for the user to compare the physical copy and the electronic copy and verify whether any data in the document is changed or missing. Additionally, or alternatively, the code can be validated to confirm authentication and/or the authentication data can be presented to the user upon request.

The techniques described herein may be implemented in a number of ways. Example implementations are provided below with reference to the following figures.

Example Architecture

FIG. 1 illustrates example architecture for an electronic verification system 100, in accordance with some embodiments. The system 100 implements a distributed ledger such as a blockchain 120. Blockchains are secure by design and exemplify a distributed computing system with high *Byzantine* fault tolerance. The blockchain 120 may include a plurality of blocks. Each block is identified with a cryptographic hash of its content, wherein the content can comprise a plurality of transactions related to text documents. Except for the first block, each block contains a reference to the previous block in the chain. The reference is the cryptographic hash of the content of the previous block. In various embodiments, the plurality of transactions can be ordered chronologically, such that each newly added block may be linked to a most recent block.

The blockchain 120 is shared among multiple computing nodes such as client devices 104, 114 or servers in communication with a network 122 and is used to record and check transactions in a cryptographically secure manner. The network 122 can be a cellular network or a geographically disparate Wi-Fi network. In some embodiments, the structure of the blocks may be tamper resistant. For instance, a block may be added to the blockchain 120 only if all of the computing nodes or a subset of nodes with sufficient computation power in the network 122 implementing the blockchain 120 agree on the block. In addition, each block has a cryptographic proof-of-work embedded in it, such that past transactions cannot be altered without breaking a chain of cryptographic proofs. Because each block in the blockchain represents a transaction or a set of transactions, more proof-of-work is needed for longer chains.

In various embodiments, the blockchain 120 is implemented to authenticate and encrypt text documents 112 that are generated via a text editor application 128. Each time a transaction is recorded to the blockchain, the transaction is organized into a transaction block for addition to the blockchain. In various embodiments, several transactions are received and are organized into a single transaction block based on predefined criteria (e.g., a timeframe in which the transactions are received). It is noted that there may be multiple chains that can be traced back to a first block in the blockchain 120, depending upon embodiments. For example, the first block can refer to transactions related to a text document. Subsequently, the text document can be duplicated to make a first set of changes to the first copy of the text document and a second set of changes to the second copy of the text document. Each of the first copy of the text document and the second copy of the document can be signed. Thereafter, the signed transaction for the first copy of the text document can be referenced in a first blockchain, and the signed transaction for the second copy of the text document can be referenced in a second blockchain. Both of the first blockchain and the second blockchain can be traced back to the first block.

The text editor application 128 can be a native software program that resides locally in part or in whole on the one or more client devices 104, 114. In the illustrated embodiment, a first user 102 operates the first client device and a second user 116 operates the second client device 114. Each of the first user 102 and the second user 116 can be an author of a text document 112, a sender of a text document 112, and/or a recipient of a text document 112. The client devices 104, 114 can comprise general-purpose computers such as desktop computers or laptop computers, as well as various mobile devices that can include smartphones, personal digital assistants (PDAs), tablet computers, and/or other electronic devices executing conventional web browser applications, or applications that have been developed for a specific platform (e.g., operating system, computer system, or some combination thereof) and that are capable of receive inputs, process the inputs, and generate output data.

Additionally, or alternatively, the text editor application 128 can be a cloud-based application or a web-based application that relies on one or more remote computing nodes 126 such as servers. In this way, the client devices 104, 114 can execute the text editor application 128 to log onto the one or more computing nodes 126 and create text documents 112, which may be stored and maintained on the client devices 104, 114 and/or a remote database. The one or more computing nodes 126 may include general-purpose computers, such as desktop computers, tablet computers, laptop computers, servers, or other electronic devices that are capable of receive inputs, process the inputs, and generate output data. In still other embodiments, the one or more computing nodes 126 may be virtual computing devices in the form of computing nodes, such as virtual machines and software containers. The one or more computing nodes 126 may store data in a distributed storage system, in which data may be stored for long periods of time and replicated to guarantee reliability. Accordingly, the one or more computing nodes 126 may provide data and processing redundancy, in which data processing and data storage may be scaled in response to demand. Further, in a networked deployment, one or more computing nodes 126 may be added or removed without affecting the operational integrity of the text editor application 128.

The architecture 100 may further include a data store 138 that is operatively coupled to the one or more computing nodes 126 for storing, managing, and maintaining the current ledger or blockchain data such as records from transactions included in the blockchain, authentication data, data pertaining to text documents, and/or so forth. The data store 138 can comprise cloud-based services. The data store 138 can comprise software utilities that facilitate the acquisition, processing, storage, reporting, and analysis of data from multiple data sources. Moreover, the data storage 138 can store data across multiple virtual data storage clusters with redundancy, so that the data may be optimized for quick access. Any databases discussed herein may include relational, hierarchical, graphical, blockchain, object-oriented structure and/or any other database configurations.

The text editor application 128 comprises a computer program that creates, stores, manipulates, and/or formats text documents 112. Additionally, the text editor application 128 enables a user (i.e., an author) to cryptographically sign text documents 112 with a private key and transmit the text document to other users (i.e., recipients). The other users of the text documents 112 can verify the author's signature by using the author's public signing key. Preferably, the author can sign each updated version of the text document. Each signed transaction is subsequently recorded in the blockchain 120. The signature can be used to authenticate the content in the text documents 112 and the identity of the author. The signature can be stored separately (e.g., in a database) from the text documents 112, depending upon embodiments. The text editor application 128 can edit text and provide features typical of a word processor such as multiple font selection, text formatting, find and replace, cut, copy, and paste, undo/redo, data transformation, filtering, syntax highlighting, extensibility (e.g., for use with plug-ins), and/or so forth. These features may be switched on and off by user command received via an application user interface 106. The application user interface 106 comprises a graphical user interface (GUI) that can include a dashboard and/or text editing or formatting tools for display.

In various embodiments, the text editor application 128 can also provide a REST-based API. The API enables an API user can create new text documents by either referencing an existing template or including an existing text document file in his or her API request. For the latter option, the API user can edit contents in the document that he or she includes in the API request. The text editor application 128 can also read and write text document files in various text format (e.g., plain text format, binary format, etc.), allowing them to open files saved from other text editor applications. In various embodiments, two or more users 102, 116 can have access to the same text document concurrently while using the text editor application 128 such that a single version of that document can be accessible to both of them. In this scenario, each author of the text document can sign the text document with his or her respective private key.

In an example embodiment, the text editor application 128 includes a font generator 130, a code generator 132, an optical character recognition (OCR) module 134, and a verification module 136. The font generator 130 is configured to generate a new font for use as a typeface on the text editor application 128. One or more fonts can comprise a user's handwriting or can comprise a unique font that is similar to a user's handwriting. To generate a font using the user's handwriting, a handwritten template comprising letters, numbers, symbols, and/or characters can be scanned via a scanner 108 that is connected to a client device 104. The scanner 108 is configured to optically scan images, printed text, handwriting or an object and convert it to a digital image. Thus, the scanner 108 can generate one or more handwritten image files 110. The scanner 108 can use a charge-coupled device (CCD) or a contact image sensor (CIS) as the image sensor. The scanner 108 can comprise a desktop scanner or a handheld scanner that utilize an image sensor (e.g., a charge-coupled device (CCD), a contact image sensor (CIS), a photomultiplier tube (PMT)). The handheld scanner can be a camera, wherein the camera can be integral to a client device 114 such as a smartphone.

The handwritten image files 110 are uploaded via the font generator 130 to be turned into standard font files (e.g., OTF or a TTF format) for downloading and installing onto the client devices 104, 114. In various embodiments, the user can upload multiple handwritten templates and upload ligatures to provide variants for different letters, numbers, symbols, and/or characters. In this way, characters can be randomized to create a more naturally looking handwritten text. Additionally, the handwritten image files 110 can comprise a bitmap image file (DIB) so as to allow a user to edit bitmap images of certain letters, numbers, symbols, and/or characters (e.g., by moving pixels) after a handwritten template is scanned. In various embodiments, the font generator 130 can generate new fonts that are not based on handwritten image files. More specifically, the font generator 130 can generate new fonts that are based on computer-generated images. Additionally, the font generator 130 can also download new fonts from third party sources for use in the text editor application 128.

The code generator 132 is configured to generate any machine-readable code 124 (e.g., a QR code, bar code, etc.) or an alphanumeric unique document ID that can be displayed on a physical or an electrical copy of a text document 112. In the latter case, the document ID can be embedded within the text document 112 such that the document ID is integral to the text document 112. The machine-readable code 124 or the unique document ID is unique to each text document 112 and each transaction related to the text document 112. Thus, the machine-readable code 124 or the unique document ID can comprise authentication data related to the transaction referenced in the blockchain 120, such as the identity of the author of the text document 112. In this way, the machine-readable code 124 or the unique document ID can be used to confirm the source of the text document 112 as well as its content.

The user 116 running the text editor application 128 can scan the machine-readable code 124 or the document ID via the scanner that is connected to the client devices 114 to transmit a verification request for a text document. If the client device 114 comprises a camera integral thereto, the application 128 activates the integrated camera on the client device 114 and the user 116 is instructed to direct the camera towards the code 124 or the document ID. The client device 114 can scan the code 124 or the document ID that is displayed on a text document 112. Scanned images of text document 112 can be stored in the data store 138 as an image in a bundle object, whereby the text document includes its content, cryptographic signature, and the machine-readable code or the unique document ID.

The OCR module 134 of the text editor application 128 is configured to read the scanned machine-readable code 124 (e.g., a QR code) or the document ID that is displayed on a printed copy of the text document 112. The OCR module 134 can utilize various code and/or OCR decoding algorithms to identify representations of the code 124 or the document ID. Upon reading the scanned code 124, the text editor application 128 can retrieve from the data store 138, an the text document 112 to display an electronic copy of the text document 112 to a user 102, 116 (e.g., via a user interface of the client device 104, 114) to enable the user 102, 116 to compare the two copies and verify whether any data in the document 112 is changed or missing. Additionally, or alternatively, verification data such as author information can be presented to the user 102, 116 upon scanning the code 124 or the document ID. In various embodiments, the unique document ID can be manually input via the text editor application 128 instead of scanning for verifying the authenticity of the text document 112.

The verification module 136 may validate the machine-readable code 124 or the document ID and authenticate the text document 112 to which the machine-readable code 124 or the document ID is correlated. In various embodiments, the verification module 136 can also confirm identities of users (i.e., authors of text documents, senders of text documents) by verifying the cryptographic signatures of block signers in any transactions associated with the text document 112. The verification module 136 can also reject invalid chains by determining whether the hash value that links a block to its immediate previous block is within a predetermined range.

Example Computing Device Components

Figure 2:
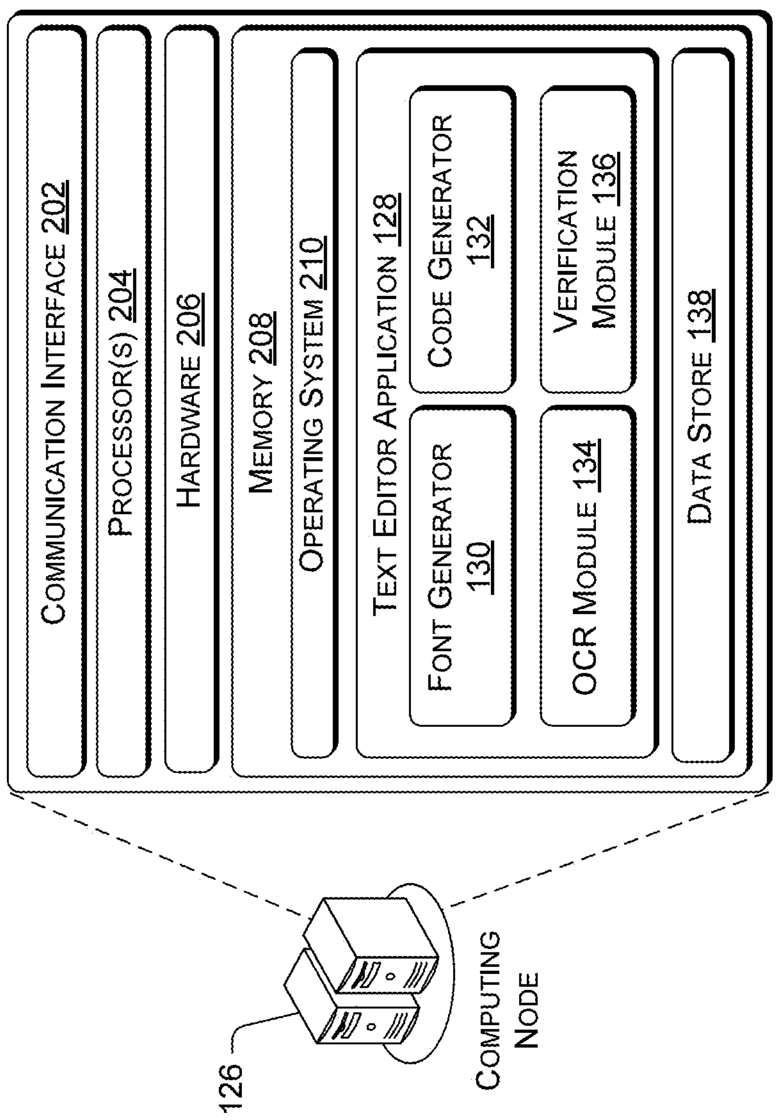
FIG. 2 is a block diagram showing various components of one or more computing devices that is configured to support the authenticating of a text document created using a text editor application with a blockchain.

FIG. 2 is a block diagram showing various components of one or more illustrative computing devices comprising one or more computing nodes 126 that can provide a text editor application 128. It is noted that the computing device(s) as described herein can operate with more or fewer of the components shown herein. Additionally, the computing device(s) as shown herein or portions thereof can serve as a representation of one or more of the computing devices of the present system.

The one or more computing nodes 126 is in communication with one or more client devices, wherein the client devices enable a user of the present system to create a text document using the text editor application 128. The one or more computing nodes 126 may include a communication interface 202, one or more processors 204, hardware 206, and a memory unit 208. The communication interface 202 may include wireless and/or wired communication components that enable the one or more computing nodes 126 to transmit data to and receive data from other networked devices. In at least one example, the one or more processor (s) 204 may be a central processing unit(s) (CPU), graphics processing unit(s) (GPU), a both a CPU and GPU, or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 204 may also be responsible for executing all computer applications stored in the memory, which can be associated with common types of volatile (RAM) and/or nonvolatile (ROM) memory. The hardware 206 may include additional hardware interface, data communication, or data storage hardware. For example, the hardware interfaces may include a data output device (e.g., visual display, audio speakers), and one or more data input devices (e.g., keypads, keyboards, mouse devices, touch screens that accept gestures, microphones, voice or speech recognition devices, etc.).

The memory unit 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the computing node 126.

The processor 204 and the memory unit 208 may implement an operating system 210. In an example embodiment, the operating system 210 can comprise Linux kernel 2.6 and above, Target kernel 4.9 running on Raspberry Pi 3 Raspbian (Debian). Additionally, the operating system 210 may include components that perform various additional functions generally associated with an operating system. For example, the operating system 210 may include components that enable the one or more computing nodes 126 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). The operating system 210 may also provide an execution environment for a text editor application 128 and a data store 138. The text editor application 128 comprises an optical character recognition module (OCR) 130, a font generator 132, a code generator 134, and a verification module 136.

The font generator 130 is configured to receive uploaded handwritten image files from a client device. The handwritten image files can be turned into font in standard font file format such as OTF or TTF format. Upon generating a font file, the font generator 130 transmits the font file to the client device for downloading and installing onto the client devices. The font can be used in the text editor application 128 or other downloadable or non-downloadable programs for entering and/or editing text, including word processors, emails, note-taking applications, and/or so forth. In various embodiments, the user can upload multiple handwritten templates and include ligatures in the templates to provide variants for different letters, numbers, symbols, and/or characters.

The font generator 130 can randomize the letters, numbers, symbols, and/or characters in order to create a more naturally looking handwritten text. In this regard, the font can comprise multiple typefaces for one or more letters, numbers, symbols, and/or characters. In various embodiments, the font generator 130 enables a user to edit one or more letters, numbers, symbols, and/or characters upon uploading the handwritten image files, for example to clean up the scanned image of the letters, number, symbols, and/or characters. Additionally, the font generator 130 can download new fonts from third party sources for use in the text editor application 128. New fonts can comprise computer-generated typefaces or typefaces that are based on computer-generated images. In various embodiments, the font can be encrypted. Handwritten computer-generated font (e.g., script font) or other types font generated via the font generator 130 can be used to typed text using the text editor application 128 as well as a wide variety of applications, including word processors, note-taking applications, emails, websites, SMS, instant messages, and/or so forth. Text documents comprising the generated font can be signed with a private key.

The code generator 132 is configured to generate any machine-readable code (e.g., a QR code, bar code, etc.) or an alphanumeric unique document identification (ID) code that can be displayed on a physical copy of a text document and/or embedded within an electronic copy of a text document. The machine-readable code or the unique document ID can be unique to each transaction related to the text document. The machine-readable code or the unique document ID can comprise metadata, which can include authentication data related to the transaction referenced in the blockchain. In this way, the machine-readable code or the unique document ID can be used to authenticate the source of the text document and verify that the content of the document is authentic.

In various embodiments, the code generator 132 can encrypt the font by manipulating the typeface. Specifically, the code generator 132 can randomly shift letterforms by making subtle changes to the shape of every letter, number, symbol, and/or character that the human eye cannot detect. For example, the code generator 132 can alter the curvature of letters or change the length or width of the letters to create discomposed variations corresponding to each letter, number, symbol, and/or character. One or more combinations of the variations of each letter, number, symbol, and/or character can be used to correspond to a machine-readable code that includes authentication data. Thus, if any changes are made to a text document, the combination of the variants of each letter, number, symbol, and/or character appearing on the document is changed, thereby producing an invalid code and no authentication data is provided to a recipient user.

The OCR module 134 is configured to read the machine-readable code and the unique document ID. The OCR module 134 implements various code and/or OCR decoding algorithms to identify representations of the machine-readable code or the unique document ID. In various embodiments, the OCR module 134 can be operatively connected to the data store 138 for accessing machine-readable code and/or alphanumeric unique document ID stored therein. Similarly, the OCR module 134 can also read and recognize typed and handwritten text displayed on a text document. In this regard, the OCR module 134 analyzes the typed or handwritten text in images and compares it to fonts in the data store 138 or checks it against known features of letters, numbers, symbols, and/or characters. In some embodiments, the OCR module 134 can read and recognize any code that is embedded within the text.

Upon receiving the scanned code from the OCR module 134, the verification module 136 is configured to validate the machine-readable code or the document ID in order to retrieve from the data store 138 the authentication data that correlates to the code. If the machine-readable code or the document ID is not recognized or valid, the verification module 136 can display an error message via the application user interface. Thereafter, the verification module 136 can instruct a user to scan or input a new code. If the machine-readable code or the document ID is valid, the verification module 136 can verify the signature on the text document. In this regard, the verification module 136 can utilize a signature-verifying algorithm to authenticate the text document. In various embodiments, the verification module 136 can provide authentication data to the user (i.e., the recipient), wherein the authentication data can be generated from a transaction referenced in the blockchain. For example, the authentication data can comprise an author's signature or the signature of a user that sent the text document to the recipient. Additionally, the authentication data can include a device identifier that can be used to recognize a client device used to generate the text document. The verification module 136 can also identify corrupt text documents with missing or altered data (e.g., bad data) and reject transactions referenced in invalid chains by detecting cryptographic hash or a similar reference that does not fall within the range required by the predefined protocol.

Example Processes

Figure 3:
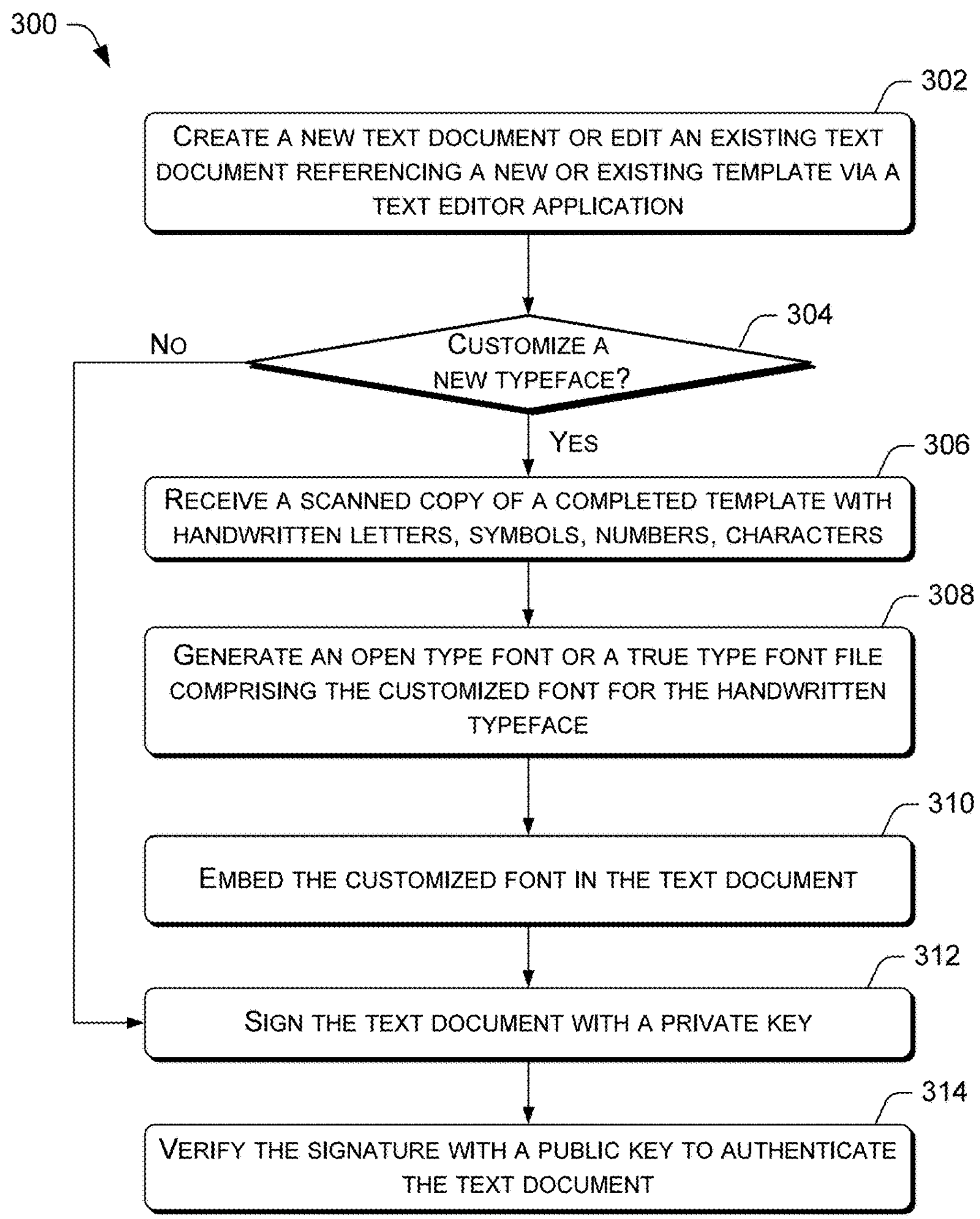
FIG. 3 is a flow diagram of an example process for authenticating a text document using blockchains.
Figure 4:
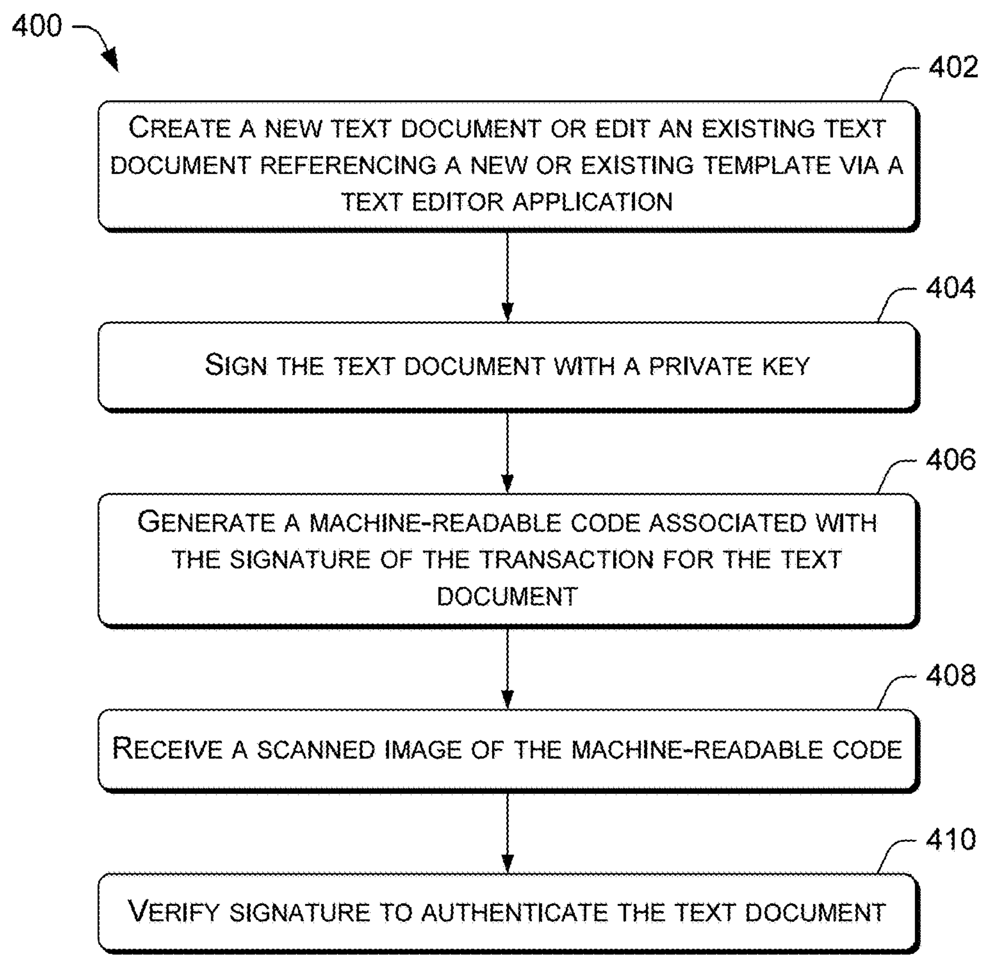
FIG. 4 is a flow diagram of an example process for authenticating a text document using a machine-readable code.

FIGS. 3-4 present illustrative processes 300-400 for using a computing device to authenticate text documents that can include a cryptographic font script. Each of the processes 300-400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-400 are generally described with reference to the architecture 100 of FIG. 1.

FIG. 3 is a flow diagram of an example process 300 for authenticating a text document using blockchains, wherein the text document can comprise a typeface using a handwritten computer-generated font. At block 302, a text editor application creates a new text document or opens an existing text document. The text document can reference a blank or new template or an existing template, wherein the template can be a custom template created by a user. At decision block 304, the text editor application receives a request to customize a new typeface or a request for a new font. To create a font based on a new typeface (yes response from the decision block 304), a font generator of the text editor application receives one or more scanned images of a completed template comprising handwritten letters, numbers, symbols, and/or characters, as indicated in block 306.

At block 308, the font generator generates an open type font or a true type font file comprising the handwritten computer-generated typeface. The font file can comprise variations of each letter, number, symbol, and/or character. The font file can be downloaded at a client device for use in a text document that can be generated via the text editor application. For instance, the text editor application can comprise a cloud-based application to enable client devices to remotely access it to create text documents.

At block 310, the text editor application embeds the customized font based on the handwritten typeface in the text document. It is noted that the text document can comprise a word processor document, an email, or a message such as an instant message, a SMS, and/or so forth. At block 312, the text document can be cryptographically signed with the user's private key, whereby the private key is generated locally on the client device. This signed transaction is referenced in a block in a blockchain. Subsequently, the text document can be updated and signed with a new cryptographic signature. In various embodiments a new or updated text document can be created. The newly signed transaction is referenced in a new block in a blockchain, and can be linked to the previous block in the blockchain. The signed text document can be transmitted to another user (i.e., a recipient) for verification.

To request a verification of the text document, the text editor application can receive a request for a verification from a client device, wherein the request can include an identification that corresponds to the text document. Thus, each new version of the document can correspond to a new identification. At block 314, the recipient can utilize the corresponding public key to verify the signature and the content of the text document. Upon verification, the text editor application can communicate authorization of the transaction to the recipient and/or the network. In various embodiments, the text document can also be authenticated by way of any of the techniques now available in the art or which may become available (e.g., Twofish, Rivest-Shamir-Adleman (RSA) algorithm, El Gamal, Schorr signature, DSA, Pretty Good Privacy (PGP), GNU Privacy Guard (GPG or GnuPG), or other symmetric and asymmetric cryptography systems).

FIG. 4 is a flow diagram of an example process 400 for verifying a physical copy of a text document using a machine-readable code. At block 402, a text editor application creates a new text document or opens an existing text document. The text document can reference a blank or new template or an existing template, wherein the template can be a custom template created by a user. At block 404, the text document can be cryptographically signed with the user's private key, whereby the private key is generated locally on the client device. At block 406, a code generator of the text editor application generates a machine-readable code or a unique document ID associated with the signature of the transaction for the text document. The code or the unique document ID can be displayed and/or embedded within the text document, depending upon embodiments. The signed text document with the machine-readable code or the document ID can be transmitted to another user (i.e., a recipient) for verification. At block 408, an OCR module of the text editor application receives a scanned image of the text document or the machine-readable code that is displayed on the text document. If the machine-readable code is valid, a verification module of the text editor application verifies the signature using a public key that is derived from the private key to authenticate the text document as indicated in block 410. Upon verification, the text editor application can communicate authorization of the transaction to the recipient and/or the network. In various embodiments, the scanned image of text document and/or the machine-readable code and the cryptographic signature for the text document can be stored in a data store as an image in a bundle object.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:

one or more non-transitory storage mediums configured to provide stored computer-readable instructions, the one or more non-transitory storage mediums coupled to one or more processors, the one or more processors configured to execute the computer-readable instructions to cause the one or more processors to:

receive a text document from a first client device, the text document utilizing a handwritten computer-generated font representing a handwriting of a user of the first client device;

apply a cryptographic signature to the text document in a transaction that is referenced in a distributed ledger comprising at least one blockchain in a blockchain distributed network;

generate a unique document identification (ID) corresponding to the cryptographic signature and the text document;

transmit the text document to the blockchain distributed network;

receive a request for a verification of the text document from a second client device;

verify the text document based at least on the cryptographic signature and the unique document ID to determine whether the transaction is authentic; and in response to the cryptographic signature and the unique document ID being verified as corresponding to the text document, communicating authorization of the transaction to the second client device.

2. The system of claim 1, wherein the one or more processors is further configured to:

receive an updated text document signed with a second cryptographic signature in a second transaction that is referenced in the distributed ledger.

3. The system of claim 2, wherein the one or more processors is further configured to:

update the distributed ledger with the authorization of the second transaction.

4. The system of claim 1, wherein the unique document ID corresponds to the first client device.

5. The system of claim 1, wherein the unique document ID comprises a machine-readable code.

6. The system of claim 1, wherein the request includes credentials in accordance with a public key infrastructure (PKI)-based authentication protocol.

7. The system of claim 1, wherein the request utilizes a multifactor authentication.

8. One or more non-transitory computer-readable media storing computer-executable instructions that upon execution cause one or more processors to perform acts comprising:

receiving a text document from a first client device, the text document utilizing a handwritten computer-generated font representing a handwriting of a user of the first client device;

applying a cryptographic signature to the text document in a transaction that is referenced in a distributed ledger comprising at least one blockchain in a blockchain distributed network;

generating a unique document identification (ID) corresponding to the cryptographic signature and the text document;

transmitting the text document to the blockchain distributed network;

receiving a request for a verification of the text document from a second client device;

verifying the text document based at least on the cryptographic signature and the unique document ID to determine whether the transaction is authentic; and in response to the cryptographic signature and the unique document ID being verified as corresponding to the text document, communicating authorization of the transaction to the second client device.

9. The one or more non-transitory computer-readable media of claim 8, wherein the distributed ledger comprises at least one blockchain in a blockchain distributed network.

10. The one or more non-transitory computer-readable media of claim 8, wherein the unique document ID is embedded within the text document.

11. The one or more non-transitory computer-readable media of claim 8, wherein the one or more non-transitory computer-readable media includes a firewall.

12. The one or more non-transitory computer-readable media of claim 8, wherein the request utilizes an identifier correlating with the first client device and the user.

13. The one or more non-transitory computer-readable media of claim 8, wherein the acts further comprise:

receiving an updated text document signed with a second cryptographic signature in a second transaction that is referenced in the distributed ledger; and generating a new unique document ID corresponding to the updated text document, wherein the updated text document and the text document are different.

14. The one or more non-transitory computer-readable media of claim 13, wherein the transaction is referenced in a first block of the distributed ledger and the second transaction is referenced in a second block of the distributed ledger, the second block comprising a cryptographic hash of the first block.

15. A computer-implemented method, comprising the steps of:

receiving a text document from a first client device, the text document utilizing a handwritten computer-generated font representing a handwriting of a user of the first client device;

applying a cryptographic signature to the text document in a transaction that is referenced in a distributed ledger comprising at least one blockchain in a blockchain distributed network;

generating a unique document identification (ID) corresponding to the cryptographic signature and the text document;

transmitting the text document to the blockchain distributed network;

receiving a request for a verification of the text document from a second client device;

verifying the text document based at least on the cryptographic signature and the unique document ID to determine whether the transaction is authentic; and in response to the cryptographic signature and the unique document ID being verified as corresponding to the text document, communicating authorization of the transaction to the second client device.

16. The computer-implemented method of claim 15, wherein the request includes credentials in accordance with a public key infrastructure (PKI)-based authentication protocol.

17. The computer-implemented method of claim 15, further comprising:

receiving an updated text document signed with an additional cryptographic signature from the second client device in an additional transaction that is referenced in the distributed ledger; and generating a new unique document ID corresponding to the updated text document, wherein the updated text document and the text document are different.

18. The computer-implemented method of claim 15, wherein the cryptographic signature is associated with the handwritten computer-generated font.

* * * * *